Patented Dec. 1, 1936

2,062,364

UNITED STATES PATENT OFFICE 2,062,364

PROCESS FOR THE PREPARATION OF COUMARIN

Gustave Kretchmar and Charles Collaud, Geneva, Switzerland, assignors to Givaudan-Delawanna, Inc., New York, N. Y., a corporation of New York No Drawing. Application May 10, 1934, Serial No. 724,944. In Switzerland May 12, 1933

3 Claims. (Cl. 260—123)

This invention relates to the production of coumarin and has for its object to provide an efficient, dependable and commercially useful process for accomplishing this purpose.

It is known that the heating of a mixture of benzylidene chloride and acetic acid in the presence of metallic salts which act as catalyzers, produces hydrochloric acid and acetyl chloride gas. During this reaction the benzylidene chloride is transformed into benzoic aldehyde according to the following reaction:

$C_6H_5.CH.Cl_2 + CH_3.CO.OH =$
$\qquad C_6H_5.CHO + CH_3.CO.Cl + HCl$

Unfortunately, the hydrochloric acid gas liberated in the presence of the catalyzers mentioned above reacts on the benzylidene chloride and the benzoic aldehyde to form condensation products at the expense of the yield in aldehyde. The quantity of these undesirable products increases still more when benzylidene chloride is substituted by one of its derivatives having a more unstable constitution, such for example as ortho (dichlor-methyl) phenyl carbonate. The reaction indicated above then only leads to resins.

On the other hand, by replacing the acetic acid by its anhydride, the reaction becomes different. There is then no evolution of hydrochloric acid and the resulting aldehyde is not affected.

It is therefore possible, according to the present invention to transform for instance, ortho (dichlor-methyl) phenyl carbonate into salicylic aldehyde which, in the presence of acetic anhydride, yields chiefly acetyl and acetylated salicylic aldehyde. The use of an excess of acetic anhydride furthermore favors the progress of the reaction.

It is known that salicylic aldehyde and its acetylized derivatives, such as for instance, acetyl-salicylic aldehyde, when heated with acetic anhydride gives coumarin. However, this reaction is very slow. Even by heating in a closed vessel and at a high temperature, it is not possible to use it to prepare coumarin under commercial conditions. In the presence of appropriate catalyzers coumarin is easily obtained with excellent yields. Naturally, it is not necessary to isolate the salicylic aldehyde and its acetylized derivatives formed during the reaction between the ortho (dichlor-methyl) phenyl carbonate and the acetic anhydride.

It is known that when working according to the German Patent #223,684 and according to the U. S. Patent #1,920,494 coumarin is obtained in a single operation from the esters of ortho (dichlor-methyl) phenol, especially the carbonate of ortho (dichlor-methyl) phenol when reacted with acetate of soda. If the acetate of soda is replaced with acetic anhydride and carbonate of ortho (dichlor-methyl) phenol in the presence of a catalyzer, acetyl chloride and carbonic acid are first formed and then coumarin and acetic acid are formed.

The reaction proceeds according to the following equations:

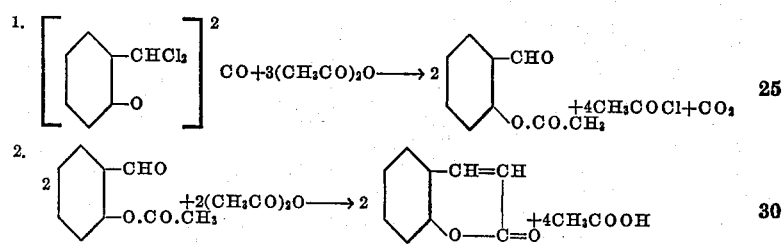

According to this invention a process is provided whereby acetyl chloride, a useful and salable by-product, is produced in the first stage of the reaction by using acetic anhydride, preferably in excess, instead of relatively useless alkali metal chloride according to previously known processes, and thereafter by successive increase of temperature the acetic anhydride and the acetic acid are distilled off, leaving as a residue crude coumarin from which the refined coumarin is recovered in the known way. The process can be carried out under ordinary or increased pressure as desired.

As catalyzers for the reaction, oxides, carbonates, chlorides, complex salts, etc. of metals such as bismuth, zinc and cobalt are suitable, the latter being preferred.

Example 1

Into a distilling apparatus is placed 1 mol. of ortho (dichlor-methyl) phenyl carbonate, 8 mols acetic anhydride and approximately 1% of the weight of an anhydride of a metal oxide, preferably cobalt.

The mixture is heated up to the boiling point to distil the acetyl chloride as formed. When no more acetyl chloride distils over the distillation is continued in order to distil off the excess of acetic anhydride, and then at higher temperature to distil off the acetic acid which is formed during the second reaction. The entire operation is completed within about 10 hours. The still then contains the crude product of the reaction, from which approximately 0.9 mol. of coumarin can be obtained.

*Example 2*

A distilling apparatus is charged with 1 mol. acetyl-salicylic aldehyde, 2 mols acetic anhydride and approximately 2% oxide of cobalt. The mixture is heated progressively at 170° and above, and the reaction is carried on as indicated in Example 1.

The invention claimed is:

1. Process for the preparation of coumarin comprising heating a mixture consisting of dichlor ortho cresol carbonate, acetic anhydride and one of the group consisting of oxides, carbonates and chlorides of zinc, bismuth and cobalt.

2. Process for the preparation of coumarin comprising heating a mixture consisting of dichlor ortho cresol carbonate, acetic anhydride and one of the group consisting of oxides, carbonates and chlorides of zinc, bismuth and cobalt to remove first the acetyl chloride formed in the first phase of the reaction and later the acetic acid which is formed in proportion as the acetyl salicyclic aldehyde is transformed into coumarin.

3. Process for the preparation of coumarin comprising heating a mixture consisting of dichlor ortho cresol carbonate, acetic anhydride and one of the group consisting of oxides, carbonates and chlorides of zinc, bismuth and cobalt to remove first the acetyl chloride formed in the first phase of the reaction, then distilling off the excess of acetic anhydride and finally removing the acetic acid which is formed in proportion as the acetyl salicylic aldehyde is transformed into coumarin.

GUSTAVE KRETCHMAR.
CHARLES COLLAUD.